UNITED STATES PATENT OFFICE.

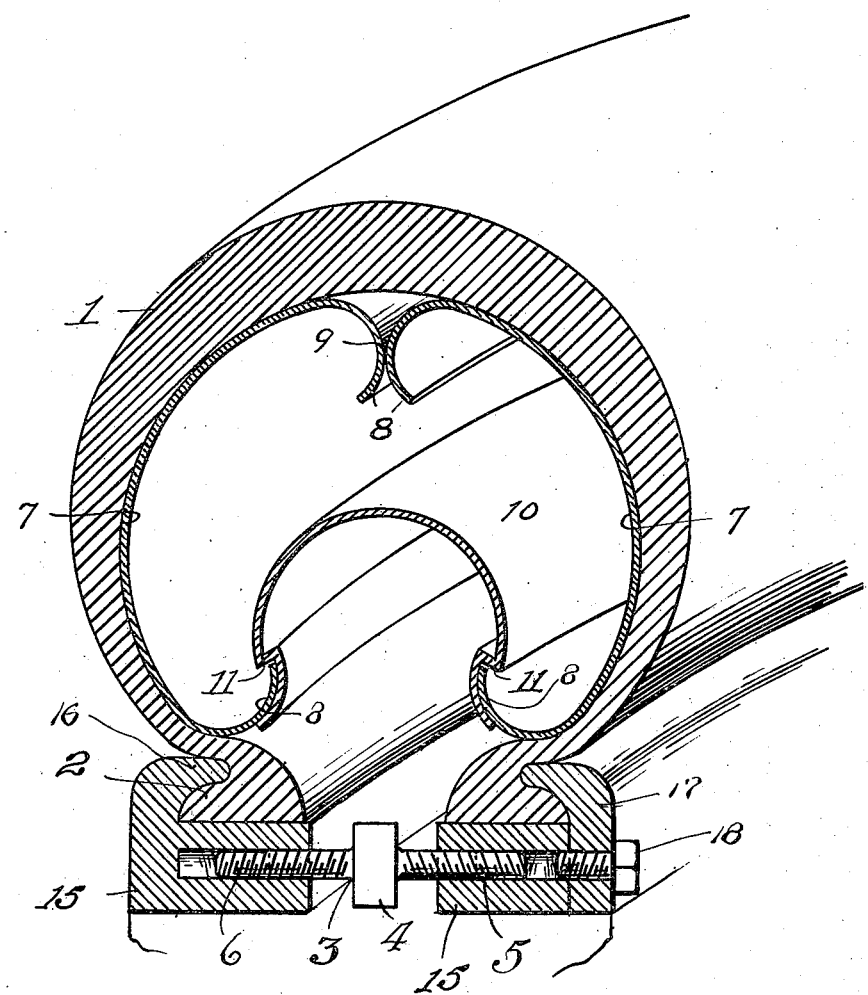

DANIEL M. ROTHENBERGER, OF LEESPORT, PENNSYLVANIA, ASSIGNOR OF ONE-THIRD TO EPHRAIM P. WANNER AND ONE-THIRD TO WILLIAM M. FRYERMUTH, BOTH OF READING, PENNSYLVANIA.

RESILIENT TIRE.

1,426,108.          Specification of Letters Patent.      Patented Aug. 15, 1922.

Application filed November 9, 1921. Serial No. 513,876.

*To all whom it may concern:*

Be it known that I, DANIEL M. ROTHENBERGER, a citizen of the United States, residing at Leesport, in the county of Berks and State of Pennsylvania, have invented certain new and useful Improvements in Resilient Tires, of which the following is a specification.

This invention relates to improvements in vehicle tires, and it pertains more particularly to the class of tires commonly known as resilient tires.

The present invention contemplates a resilient tire other than the inflatable or pneumatic type.

The invention consists of a hollow tread member or shoe, and a plurality of metal spring members located within the tread member, so arranged as to provide the resilient feature without the attending annoyance usually accompanying punctures or blow outs.

The invention is more fully described in the accompanying specification and clearly illustrated in the drawing forming a part of this application, and in which I have shown my improved tire in sectional view, portions thereof being shown in perspective.

The numeral 1 designates the usual tread or shoe, which is of elastic material, as usual, and formed with the usual ribs or flanges 2 by means of which it may be secured to the wheel.

The numeral 3 designates one of a series of threaded rods each of which is provided with an integral and centrally located square wrench engaging portion 4 whereby the rod may be turned. The rod is formed with opposed right and left hand threads, 5 and 6 respectively, adapted to rotate in the securing members 15 and to serve as a means of drawing said securing members toward or away from the vertical centre, to secure or release the shoe.

One of the securing members 15 is formed with the usual inwardly curved lip 16 to engage the flange 2 of the shoe, while the opposite member 15 is provided with a detachable flange 17 for accomplishing the same purpose and which flange member is held in position by set screws, as indicated by the numeral 18.

Within the shoe 1, I locate a plurality of pairs of steel spring members 7, each member having both its longitudinal edges curved, as shown by the numeral 8, the outer curved edge portion 8 of each member bearing normally against the outer curved portion 8 of its opposed spring member, as indicated at 9, and adapted to ride upon each other at these points when pressure is placed upon the tread.

The numeral 10 designates a supplemental or inner metal spring or resilient member, which is annular or circular in form, made of a single piece and whose ends do not quite contact with each other when the tire is not under compression. This member 10 is formed with an annular ledge 11 on each of its two opposed sides, and these ledges are engaged by the lower or inner curved edges of the spring members 7.

The members 7 are preferably arranged in pairs, directly opposed to each other, and I provide, preferably, three such pairs of spring members, each pair covering approximately one-third of the interior of the shoe.

It is evident from the illustration of my invention, and from the description thereof, that when the parts are assembled as shown, any compression of the tire will cause the members 7 and the member 10 to co-act in resiliently resisting said pressure, due in part to the engagement of the opposed curved edges of the members 7, and in part to the engagement of the opposite or inner edges of said members 7 with the centrally disposed annular member 10, with the result that the desired resiliency is obtained without any of the objections attending the use of the inflated or pneumatic tire.

It is evident that the number of sections 7 may be varied to suit circumstances, and that the exact form of said members and of the member 10 may also be varied without departing from the spirit of the invention as disclosed, and which I have described and illustrated as a preferred form.

Having thus described my invention, I claim:—

1. A resilient tire comprising a tread, tread engaging members, an annular resilient member located centrally within the tread and a plurality of pairs of spring members fitting snugly against the inner wall of the thread, each such member having both longitudinal edges curved inwardly and one curved edge of each spring member engaging the annular resilient member.

2. In a resilient tire, a hollow tread, tread engaging members, two opposed spring members located inside the tread in opposed relation, the outer and inner edges of said members being curved and the outer curved edges bearing against each other; an annular resilient member centrally located within the tread, said resilient member having a ledge on each side and adapted for engagement by the inner curved edges of the opposed spring members.

3. In a resilient tire, the combination of a hollow tread, a pair of tread engaging members and means for drawing said members toward and away from each other, with an annular, resilient member located centrally within the tread and a plurality of pairs of spring members also located within the tread and bearing against the inner wall thereof and normally in engagement with the said annular resilient member.

4. In a tire, the combination of a hollow tread, an annular resilient member located therein, said member having a ledge on each side, with a plurality of spring members bearing normally against the inner wall of the tread and whose inner edges are in engagement with said ledges.

In testimony whereof I affix my signature.

DANIEL M. ROTHENBERGER.